US009279394B2

(12) United States Patent
LaPointe et al.

(10) Patent No.: US 9,279,394 B2
(45) Date of Patent: Mar. 8, 2016

(54) EXHAUST SYSTEM FOR SPARK-IGNITED GASEOUS FUEL INTERNAL COMBUSTION ENGINE

(71) Applicant: CUMMINS IP, INC., Columbus, IN (US)

(72) Inventors: Leon A. LaPointe, Columbus, IN (US); Edward J. Lyford-Pike, Columbus, IN (US); Daniel J. Mohr, Scipio, IN (US); Ashish Gupta, Columbus, IN (US); Aleksey Yezerets, Columbus, IN (US); Neal W. Currier, Columbus, IN (US); Tamas Szailer, Clarkston, MI (US); Thomas M. Yonushonis, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 0 days.

(21) Appl. No.: 14/755,876

(22) Filed: Jun. 30, 2015

(65) Prior Publication Data
US 2015/0300297 A1 Oct. 22, 2015

Related U.S. Application Data

(62) Division of application No. 13/614,084, filed on Sep. 13, 2012, now abandoned.

(51) Int. Cl.
F01N 5/04 (2006.01)
F02M 25/07 (2006.01)
(Continued)

(52) U.S. Cl.
CPC ........... F02M 25/0706 (2013.01); F01N 3/101 (2013.01); F01N 3/108 (2013.01);
(Continued)

(58) Field of Classification Search
CPC .............. F02M 27/02; F02M 25/0718; F02M 25/0722; F02M 25/0726; F02M 25/0706; F01N 3/101
USPC .......................................... 60/280
See application file for complete search history.

(56) References Cited

U.S. PATENT DOCUMENTS 5,131,224 A  7/1992 Siewert et al.
5,208,204 A  5/1993 Subramanian et al.
(Continued)

FOREIGN PATENT DOCUMENTS

EP        2397216 A1     12/2011
JP        2000279766     10/2000
WO     WO 2007/087725 A1  8/2007

OTHER PUBLICATIONS

International Search Report and Written Opinion for International Application No. PCT/US2013/059794, dated Dec. 5, 2013, 8 pages.
(Continued)

Primary Examiner — Jason Shanske
(74) Attorney, Agent, or Firm — Foley & Lardner LLP

(57) ABSTRACT

An internal combustion engine system includes a spark-ignited internal combustion engine powered by a gaseous fuel. The engine system also includes an air intake in air providing communication with the internal combustion engine. Further, the engine system includes an exhaust system in exhaust gas receiving communication with the internal combustion engine. The exhaust system includes a methane oxidation catalyst through which at least a portion of the exhaust gas flows and an exhaust gas recirculation line in exhaust gas providing communication with the air intake.

19 Claims, 7 Drawing Sheets

(51) Int. Cl.
- *F02M 27/02* (2006.01)
- *F01N 3/10* (2006.01)
- *F02B 37/00* (2006.01)
- *F02B 43/10* (2006.01)

(52) U.S. Cl.
CPC ............... *F02B 37/00* (2013.01); *F02B 43/10* (2013.01); *F02M 25/0718* (2013.01); *F02M 25/0722* (2013.01); *F02M 25/0726* (2013.01); *F02M 27/02* (2013.01); *F02B 2043/103* (2013.01); *Y02T 10/121* (2013.01); *Y02T 10/22* (2013.01)

(56) References Cited

U.S. PATENT DOCUMENTS

| | | | |
|---|---|---|---|
| 5,318,760 A | 6/1994 | Subramanian et al. | |
| 5,947,063 A | 9/1999 | Smith et al. | |
| 6,301,887 B1 | 10/2001 | Gorel et al. | |
| 6,405,720 B1 | 6/2002 | Collier, Jr. | |
| 6,508,209 B1 | 1/2003 | Collier, Jr. | |
| 6,823,852 B2 | 11/2004 | Collier, Jr. | |
| 6,948,475 B1 | 9/2005 | Wong et al. | |
| 7,131,271 B2 | 11/2006 | Bulicz et al. | |
| 7,281,531 B1 | 10/2007 | Fulton et al. | |
| 2006/0153761 A1 | 7/2006 | Bandl-Konrad et al. | |
| 2008/0178853 A1 | 7/2008 | Yamaoka et al. | |
| 2009/0249783 A1* | 10/2009 | Gokhale | F02D 41/005 60/602 |
| 2009/0277431 A1 | 11/2009 | Nitzke et al. | |
| 2010/0186491 A1 | 7/2010 | Shibata et al. | |
| 2010/0205941 A1 | 8/2010 | Okada et al. | |
| 2010/0212294 A1 | 8/2010 | Narayanaswamy et al. | |
| 2011/0005204 A1* | 1/2011 | Bandl-Konrad | B01D 53/9431 60/276 |
| 2011/0023829 A1 | 2/2011 | Miyashita | |
| 2011/0072788 A1 | 3/2011 | Ruona et al. | |
| 2011/0072801 A1* | 3/2011 | Lupescu | F01N 3/031 60/287 |
| 2011/0131975 A1* | 6/2011 | Styles | F02D 9/16 60/602 |
| 2011/0132322 A1* | 6/2011 | Boyer | F02B 47/08 123/337 |

OTHER PUBLICATIONS

English translation of Japanese Patent Application Publication No. JP 2000279766A (Oct. 2000).

* cited by examiner

EXHAUST SYSTEM FOR SPARK-IGNITED GASEOUS FUEL INTERNAL COMBUSTION ENGINE

CROSS REFERENCE TO RELATED PATENT APPLICATIONS

This application is a divisional of U.S. patent application Ser. No. 13/614,084, filed Sep. 13, 2012, the contents of which are incorporated herein by reference in the entirety.

FIELD

This disclosure relates to spark-ignited gaseous fuel internal combustion engines, and more particularly to controlling exhaust emissions and power density with an exhaust system for such internal combustion engines.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for spark-ignited gasoline (e.g., non-gaseous) engines typically monitor the release of carbon monoxide, nitrogen oxides (NOx), and unburned hydrocarbons (UHC). Catalytic converters (e.g., oxidation catalysts) implemented in an exhaust gas aftertreatment system have been used to eliminate many of the regulated pollutants present in exhaust gas generated from gasoline powered engines. For example, some known three-way catalysts include carefully selected catalytic material formulations to specifically oxidize carbon monoxide and unburned hydrocarbons, and reduce nitrogen oxides to less harmful components, present in the exhaust gas. Conventional three-way catalysts are designed to oxidize or reduce such pollutants more efficiently for engines running above the stoichiometric air-to-fuel ratio (i.e., rich conditions).

Recently, due at least in part to high crude oil prices, environmental concerns, and future fuel availability, many internal combustion engine designers have looked to at least partially replace crude oil fossil fuels, e.g., gasoline and diesel, with so-called alternative fuels for powering internal combustions engines. Desirably, by replacing or reducing the use of fossil fuels with alternative fuels, the cost of fueling internal combustion engines is decreased, harmful environmental pollutants are decreased, and/or the future availability of fuels is increased. Known alternative fuels include gaseous fuels or fuels with gaseous hydrocarbons, such as, for example, natural gas, petroleum gas (propane), and hydrogen. The combustion byproducts present in exhaust gas generated by spark-ignited gaseous-powered engines are similar to those present in exhaust gas generated by spark-ignited non-gaseous-powered engines. Accordingly, conventional gaseous-powered engine systems utilize the same oxidation catalysts found in non-gaseous-powered engine systems to oxidize the regulated pollutants generated by gaseous-powered engines.

However, gaseous-powered engines also generate exhaust gas with relatively large amounts of presently unregulated pollutants, such as methane. Traditionally, gaseous-powered engines are operated at rich air-to-fuel ratios (e.g., richer than stoichiometric) in order to reduce oxygen concentrations within the exhaust gas, and thus the formation of carbon monoxide and nitrogen oxides. Operating under such rich air-to-fuel ratios consequently generates very high levels of unburned hydrocarbons, such as methane. Conventional gaseous-powered engine systems do not include oxidation catalysts capable of oxidizing methane. Accordingly, gaseous-powered engine systems allow large amounts methane to escape into the atmosphere.

Additionally, operating a gaseous-powered engine under stoichiometric or richer air-to-fuel ratios results in a relatively low brake thermal efficiency of the engine. Moreover, operating at such air-to-fuel ratios causes high combustion temperatures, which result in high component temperatures in the engine, and the necessity to reduce output power to avoid component failure. However, in view of the premium placed on satisfying exhaust emissions regulations, conventional gaseous-powered engines are designed to meet exhaust emissions regulations at the expense of thermal efficiency and power density.

Further, as recognized by the inventors, some internal combustion engine systems that employ exhaust gas recirculation (EGR) strategies often suffer from the formation of harmful condensates within the air and charge air intake line. For example, the presence of certain emissions in the recirculated exhaust (e.g., CO, $CO_2$, NOx, and UHC) can cause the formation of aggressive acids in the condensate within the intake circuit of the engine should charge temperature fall below the dew point at any location within the intake system. CO and $CO_2$ may result in carbonic acid forming in the condensate within the intake system and NOx may result in the formation of nitric acid within the condensate. Of these two acids, nitric acid is more aggressive and has the greater potential to negatively affect the service life of the components of the intake system.

SUMMARY

The subject matter of the present application has been developed in response to the present state of the art, and in particular, in response to the problems and needs in the art that have not yet been fully solved by currently available exhaust systems for gaseous-powered internal combustion engines. Accordingly, the subject matter of the present application has been developed to provide an exhaust system for a gaseous-powered engine that has an aftertreatment catalyst (e.g., a three-way catalyst possibly capable of methane oxidation) and exhaust gas recirculation strategies for overcoming at least some shortcomings of the prior art systems.

For example, according to one embodiment, an internal combustion engine system includes a spark-ignited internal combustion engine powered by a gaseous fuel. The engine system also includes an air intake in air providing communication with the internal combustion engine. Further, the engine system includes an exhaust system in exhaust gas receiving communication with the internal combustion engine. The exhaust system includes an aftertreatment catalyst (e.g., a methane oxidation catalyst) through which at least a portion of the exhaust gas flows and an exhaust gas recirculation line in exhaust gas providing communication with the air intake. The gaseous fuel can be substantially solely natural gas.

In some implementations, the engine system includes a turbocharger that has a turbine co-rotatably coupled with a compressor. The turbine is in exhaust gas receiving communication with the internal combustion engine and exhaust gas providing communication with the methane oxidation catalyst. The compressor is in air receiving communication with the air intake and charge air providing communication with the engine.

According to certain implementations of the engine system, the exhaust gas recirculation line is positioned upstream of the aftertreatment catalyst and downstream of the turbine. In such implementations, the exhaust system can further include an auxiliary aftertreatment catalyst (e.g., a catalyst capable of nitrogen oxide reduction) positioned within the exhaust gas recirculation line. The exhaust gas recirculation line can be a first exhaust gas recirculation line, and the exhaust system can further include a second exhaust gas recirculation line in exhaust gas providing communication with the first exhaust gas recirculation line. The second exhaust gas recirculation line can be positioned upstream of the turbine. An auxiliary catalyst can be positioned within the second exhaust gas recirculation line. Further, the exhaust system can include a pump in exhaust gas receiving communication with the first and second exhaust gas recirculation lines and exhaust providing communication with the air intake. In some implementations, an auxiliary aftertreatment catalyst can be positioned downstream of the pump.

In yet some implementations of the engine system, the exhaust gas recirculation line is positioned downstream of the aftertreatment catalyst. The exhaust gas recirculation line can be a first exhaust gas recirculation line, and the exhaust system can further include a second exhaust gas recirculation line in exhaust gas providing communication with the first exhaust gas recirculation line. The second exhaust gas recirculation line is positioned upstream of the turbine. An auxiliary aftertreatment catalyst can be positioned within the second exhaust gas recirculation line. In some instances, the exhaust system includes a pump in exhaust gas receiving communication with the first and second exhaust gas recirculation lines and exhaust providing communication with the air intake. In such instances, an auxiliary aftertreatment catalyst can be positioned downstream of the pump.

According to certain implementations of the engine system, the exhaust system further includes an exhaust throttle positioned upstream of the aftertreatment catalyst and downstream of the exhaust gas recirculation line. In yet other implementations, the exhaust system further includes a passive exhaust orifice positioned downstream of the aftertreatment catalyst, and the air intake includes an intake throttle.

In some implementations of the engine system, the exhaust system further includes at least one auxiliary aftertreatment catalyst (e.g., a catalyst capable of carbon monoxide oxidation and a catalyst capable of nitrogen oxide reduction) through which at least a portion of the exhaust gas flows.

According to another embodiment, an exhaust system for use with a spark-ignited gaseous fuel internal combustion engine is disclosed. The engine includes a turbocharger with a turbine in exhaust receiving communication with the engine and a compressor in charge air providing communication with the engine. The exhaust system includes a main exhaust gas line in exhaust gas receiving communication with the turbine. Additionally, the exhaust system includes a three-way catalyst that is positioned within the main exhaust line. The three-way catalyst is configured to oxidize carbon monoxide and methane, and reduce nitrogen oxides present in the exhaust gas flowing through the main exhaust gas line. The exhaust system also includes an exhaust gas recirculation line in exhaust gas receiving communication with the main exhaust line and exhaust gas providing communication with air flow received by the compressor. The exhaust gas recirculation line is positioned downstream of the three-way catalyst.

In yet another embodiment, an exhaust system for use with a spark-ignited gaseous fuel internal combustion engine that includes a turbocharger having a turbine in exhaust receiving communication with the engine and a compressor in charge air providing communication with the engine is disclosed. The exhaust system includes a main exhaust gas line in exhaust gas receiving communication with the turbine. Additionally, the exhaust system includes a three-way catalyst positioned within the main exhaust line, the three-way catalyst configured to oxidize carbon monoxide and methane, and reduce nitrogen oxides present in the exhaust gas flowing through the main exhaust gas line. The exhaust system also includes an exhaust gas recirculation line in exhaust gas receiving communication with the main exhaust line and exhaust gas providing communication with air flow received by the compressor. The exhaust gas recirculation line is positioned downstream of the three-way catalyst.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As discussed above, the present disclosure relates to an exhaust system for a spark-ignited gaseous fuel internal combustion engine. Generally, the exhaust system is configured to oxidize excess methane in the exhaust gas generated by the engine and recirculate a portion of the generated exhaust gas back into the charge air prior to combustion. In general terms, the combination of a methane oxidation catalyst and EGR in a gaseous-powered engine allows the engine system to utilize recirculated exhaust gas to effectively cool the combustion temperatures by reducing the air-to-fuel ratio to below stoichiometric conditions. Because the combustion temperatures are reduced, the brake thermal efficiency is increased and a resultant increase in the load carrying ability and power density of the engine is achieved. In some implementations, the load carrying ability of the engine is increased by as much as 50%, and in some cases more than 50%. Further, reducing the combustion temperature in this manner can also reduce the amount of nitrogen oxides (NOx) in the combustion byproducts.

However, despite the advantages that cooling the combustion temperatures have over prior art systems, some undesirable consequences may result. For example, cooling the combustion process with the infusion of EGR can cause in-cylinder quenching, which leads to an increase in oxygen ($O_2$) in the exhaust gas. Generally, the higher the levels of oxygen in the exhaust gas, the harder it is to covert NOx in the exhaust gas to less harmful emissions. Accordingly, the system of the present disclosure includes a methane oxidation catalyst to oxidize the relatively large amounts of methane in the exhaust gas compared to non-gaseous fueled engines (e.g., gasoline-powered and diesel-powered engines). The oxidation of methane removes the excess oxygen from the exhaust gas, which improves the ability of the exhaust system to convert NOx in the exhaust gas.

Generally, in certain embodiments, the exhaust system of the present disclosure includes a NOx reduction catalyst or other NOx reducing component within the EGR line. The NOx reduction catalyst acts to remove NOx from the EGR exhaust gas before the EGR cooler has an opportunity to condense the NOx, which reduces the likelihood of nitric acid formation within the EGR line and air intake line.

Figure 1:
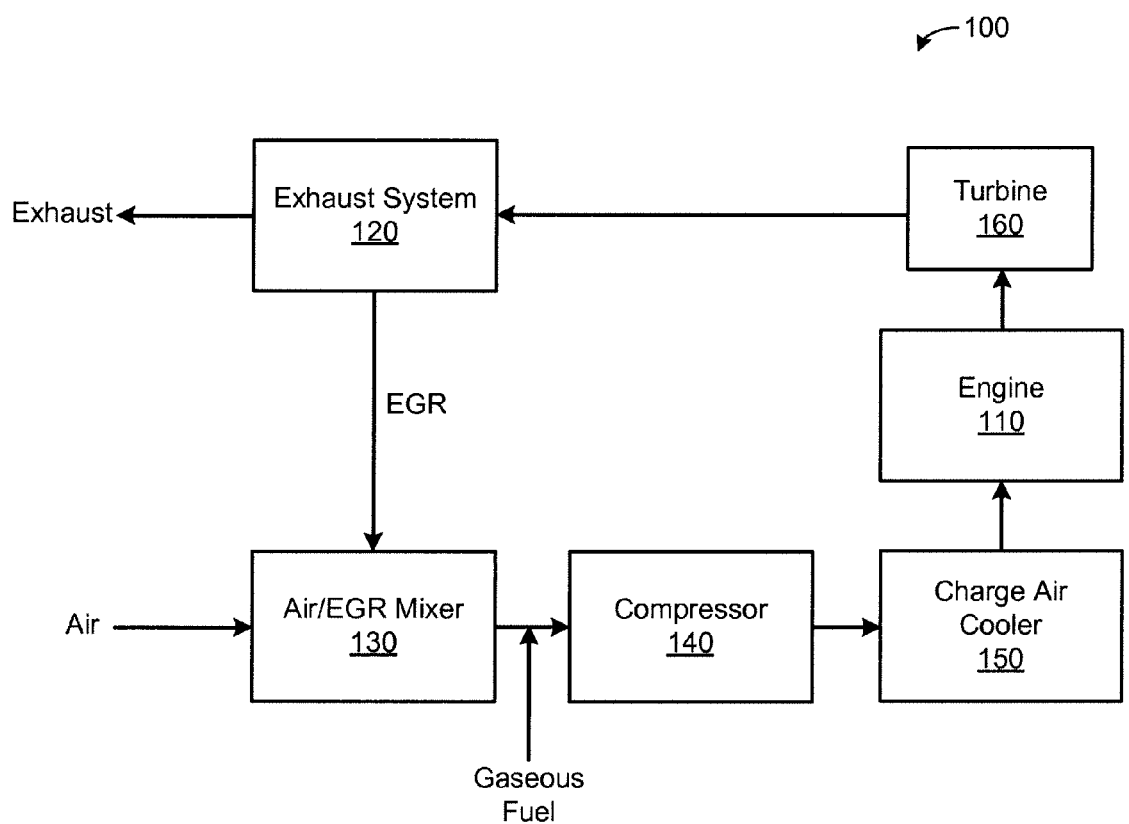
FIG. 1 is a schematic diagram of an internal combustion engine system having an exhaust system according to one embodiment.

According to one specific embodiment of an internal combustion engine system 100 shown in FIG. 1, the system includes an internal combustion engine 110 coupled to an exhaust system 120. The engine 110 is a spark-ignited engine fueled by gaseous hydrocarbons, such as natural gas, petroleum gas (propane), and hydrogen. As defined herein, gaseous fuels, as opposed to non-gaseous fuels (e.g., gasoline and diesel), are those that are introduced and managed within the engine in a gaseous state, as opposed to, a liquid or solid state. In the illustrated implementations, the engine 110 is a spark-ignited engine fueled by natural gas. Spark-ignited gaseous fuel engines are configured and calibrated differently than spark-ignited non-gaseous fuel engines. Gaseous fuel engines introduce considerations not present with non-gaseous engines. For example, non-gaseous engines do not produce significant amounts of certain combustion byproducts produced by gaseous engines. Of particular relevance to the illustrated embodiments of the system 100 of the present disclosure, non-gaseous fuel engines produce no more than nominal amounts of methane compared to gaseous fuel engines, which produce large amounts of methane when the gaseous fuel itself contains a large amount of methane, which is normal with natural gas and a wide variety of other gaseous fuels.

The internal combustion engine system 100 also includes an air intake system that includes an air/EGR mixer 130, a compressor 140, and a charge air cooler 150. The air intake system includes an air inlet that is at essentially atmospheric pressure, thus enabling fresh air to enter the air system. The fresh air is mixed with recirculated exhaust gas in the air/EGR mixer 130. In the illustrated implementation, fuel is added to the air/EGR mixture prior to entering the compressor 140 of a turbocharger. In another implementation, fuel can be added to the air before the air/EGR mixer 130. In yet another implementation, fuel can be added to the air/EGR mixture after the compressor. For example, in one implementation, fuel is directly injected into the combustion chambers of the engine via a common rail and a plurality of fuel injectors. Generally, the fuel is supplied from a fuel tank and pumped through a fuel delivery system via a fuel pump prior to being injected into the system. With or without injected fuel, the air/EGR mixture is compressed by the compressor 140 to increase the pressure and density of the mixture. The compressor 140 co-rotatably driven by the turbine 160, which is driven by the exhaust gas flow from the engine 110 as is known in the art. The compressed air/EGR mixture then enters the charge air cooler 150, which decreases the temperature of the intake air charge for sustaining the use of a denser intake charge into the engine. Following cooling, the air/EGR mixture is directed into the combustion chambers of the engine. Whether the fuel is injected directly into the combustion chambers or injected into the air/EGR mixture upstream of the engine, the combined fuel and air/EGR mixture is ignited via a spark-ignition system to generate, and the fuel is combusted to generate the pressure differential within the chambers for powering the engine.

Combustion of the fuel produces exhaust gas that is operatively vented to the exhaust system 120 after driving the turbine 160 of the turbocharger. Generally, the exhaust system 120 treats, regulates, and directs the exhaust gas received from the engine. The exhaust system 120 can include one or more exhaust treatment components, such as, for example, three-way catalysts, oxidation catalysts, filters, adsorbers, and the like, for treating (i.e., removing pollutants from) the exhaust gas. Preferably, the exhaust system 120 includes a methane oxidation catalyst. As defined herein, a methane oxidation catalyst is any exhaust aftertreatment catalyst that is capable of oxidizing methane in the received exhaust gas. As will be described in more detail below, the methane oxidation catalyst can be a stand-alone flow-through catalyst or form part of a three-way flow-through catalyst. Additionally, the exhaust system 120 can include exhaust flow regulation devices to regulate the exhaust gas flow rate and pressure (e.g., backpressure) of exhaust gas flowing into, through, and out of the system 120. Also, the exhaust system 120 can include actuators and valves to direct exhaust gas to one or more destinations. For example, the exhaust system 120 can include an EGR valve that is actuatable to direct (e.g., vent) a portion of the received exhaust gas into the atmosphere as expelled exhaust and direct a portion of the received exhaust gas into one or more EGR lines for recirculation back into the combustion chambers.

Figure 2:
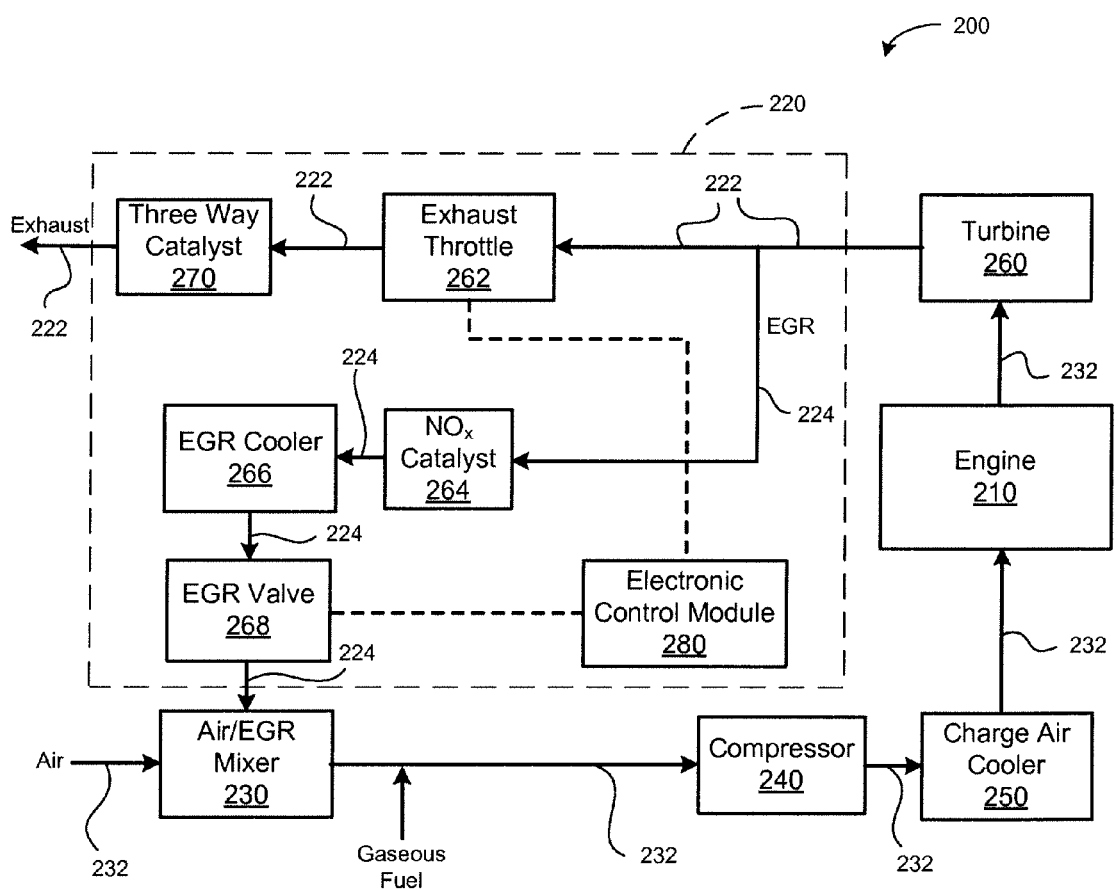
FIG. 2 is a schematic diagram of an internal combustion engine system having an exhaust system with a three-way catalyst and a low-pressure exhaust gas recirculation (EGR) line upstream of the three-way catalyst according to one embodiment.

As shown in FIG. 2, one embodiment of an internal combustion engine system 200 includes features and components similar to the features and components of the engine system 100 of FIG. 1, with like numbers and titles referring to like elements. For example, the engine system 200 includes an engine 210, which in some implementations shares the same features as the engine 110 of engine system 100 (e.g., engine 210 is a spark-ignited gaseous fuel engine). The exhaust system 220 of the engine system 200 includes a main exhaust line 222 in exhaust receiving communication with the engine 210 and a low pressure (LP) EGR line 224 in exhaust receiving communication with the main exhaust line.

Positioned within the main exhaust line 22 is a three-way catalyst 270. The three-way catalyst 270 is a flow-through type catalyst having a catalyst bed exposed to the exhaust gas flowing through the main exhaust line 222 and past the bed. The catalyst bed includes a catalytic layer disposed on a washcoat or carrier layer. The carrier layer can include any of various materials (e.g., oxides) capable of suspending the catalytic layer therein. The catalyst layer is made from one or more catalytic materials selected to react with (e.g., oxidize) one or more pollutants in the exhaust gas. The catalytic materials of the three-way catalyst 270 can include any of various materials, such as precious metals platinum, palladium, and rhodium, as well as other materials, such as transition metals cerium, iron, manganese, and nickel. Further, the catalyst materials can have any of various ratios relative to each other for oxidizing and reducing relative amounts and types of pollutants as desired.

Generally, the three-way catalyst 270 is so termed because it contains catalytic materials specifically selected to react with and oxidize or reduce three specific pollutants. The three specific pollutants include carbon monoxide (CO), unburned hydrocarbons (UHC), and nitrogen oxides (NOx). Unlike conventional three-way catalysts, the three-way catalyst 270 includes catalytic materials specifically configured to oxidize the UHC methane. As discussed above, significantly high amounts of methane is a UHC byproduct of the combustion of gaseous fuels, such as natural gas. In some implementations, any of various catalytic material formulations can be used to oxidize such large amount of methane. In one particular implementation, methane is oxidized in the presence of at least one catalytic material that is high in precious metal content, such as palladium, platinum, and rhodium. Although the three-way catalyst 270 is depicted as a single unit in FIG. 2, in some embodiments, the three-way catalyst can be formed of two or more separate, disparate units. For example, in one embodiment, the three-way catalyst 270 is housed within a single housing, while in another embodiment, the three-way catalyst 270 includes three separate catalysts (e.g., a CO oxidation catalyst, a methane oxidation catalyst, and a NOx reduction catalyst) each housed within a separate housing. Although not shown, the main exhaust line 222 may include other exhaust treatment devices, such as filters, that further treat the exhaust gas before it vents into the atmosphere.

Additionally, in some implementations where the three-way catalyst 270 is housed within the same housing, the catalyst includes three catalyst beds positioned adjacent each other to form three separate catalyst stages. According to one implementation, the methane oxidation stage is upstream of the NOx reduction stage such that the amount of excess oxygen in the exhaust gas is first reduced via methane oxidation before NOx is reduced by the NOx reduction stage. In this manner, excess oxygen in the exhaust gas generated by the engine due to operation under lean stoichiometric conditions does not negatively affect the ability of the NOx reduction catalyst to reduce NOx.

The main exhaust line 222 also includes one or more exhaust flow regulation devices configured generally to regulate the flow rate and backpressure of exhaust gas within the main exhaust line. In the illustrated embodiment of the system 200 in FIG. 2, the exhaust flow regulation device is an exhaust throttle 262 that is actuatable to modulate the backpressure within the main exhaust line 222 upstream of the exhaust throttle. The exhaust throttle 262 can be a simple valve, such as a butterfly valve, or any of various other types of devices providing pressure-regulating functionality. Control of the exhaust throttle 262, and thus the backpressure of the exhaust gas in the main exhaust line 222, is provided by an electronic control module 280. Generally, the electronic control module 280 receives multiple inputs, processes the inputs, and transmits multiple outputs. The multiple inputs may include sensed measurements from the sensors and various user inputs. The inputs are processed by the electronic control module 280 using various algorithms, stored data, and other inputs to update the stored data and/or generate output values. The generated output values and/or commands are transmitted to other components of the controller and/or to one or more elements of the engine system 200 to control the system to achieve desired results, and more specifically, achieve desired exhaust gas emissions and load carrying ability of the engine.

The electronic control module 280 also controls actuation of an EGR valve 268 for regulating the amount or flow rate of exhaust gas recirculating to the engine via the LP EGR line 224. The LP EGR line 224 includes an inlet in exhaust receiving communication with exhaust gas in the main exhaust line 222 at a location upstream of the three-way catalyst 270 and exhaust throttle 262. Further, the inlet of the LP EGR line 224 is positioned downstream of the turbine 260. Because the pressure of the exhaust gas exiting the turbine 260 is lower than the pressure of the exhaust gas entering the turbine (the pressure difference being attributable to the pressure energy lost from driving the turbine), the EGR line 224 fluidly coupled to the main exhaust line 222 downstream of the turbine is considered a low pressure EGR line.

However, for the recirculating exhaust gas in the LP EGR line 224 to be drawn into the air intake line 232, the pressure of the exhaust gas in the LP EGR line, and thus the main exhaust line 222 downstream of the turbine 260, must be higher than the pressure of the air in the air intake line. This necessary pressure differential is created by the operation of the exhaust flow regulating device (e.g., exhaust throttle 262). By closing the exhaust flow regulating device to allow less exhaust gas through, the device induces a backpressure in the main exhaust line 222, which effectively increases the pressure of the exhaust gas in the main exhaust line, thus creating the necessary pressure differential. Based on the pressure of the exhaust gas controlled by the exhaust throttle 262, actuation of the EGR valve 268 is controlled by the electronic control module 280 to provide a desired flow rate and concentration of recirculated exhaust gas into the air intake line 232. Prior to entering the air intake line and mixing with the air via the air/EGR mixer 230, the recirculating exhaust gas in the LP EGR line 224 passes through an EGR cooler 266 to cool the exhaust gas. Further, although the EGR valve 268 is shown downstream of the EGR cooler 266, in some embodiments, the EGR valve 268 can be located upstream of the EGR cooler.

As discussed above, NOx-generating engine systems with EGR have a tendency to form nitric acid condensates within the EGR line and air intake line due to NOx in the recirculating gas. Accordingly, the LP EGR line 224 includes a NOx catalyst 264 upstream of the EGR cooler 266 that is configured to reduce NOx to constituents (e.g., nitrogen and water) that are less prone to inducing the formation of nitric acid. The NOx catalyst 264 has a bed exposed to the recirculating exhaust gas flowing through the LP EGR line and past the bed. Similar to the three-way catalyst 270, the bed of the NOx catalyst 264 includes a catalytic layer disposed on a washcoat layer. The catalytic layer includes catalytic materials configured to reduce NOx in the recirculating exhaust gas to less harmful components. In one embodiment, the NOx catalyst 264 is a NOx adsorber catalyst. In another embodiment, the NOx catalyst 264 is a selective catalytic reduction (SCR) catalyst that forms part of a SCR system.

In the illustrated embodiment of the exhaust system 220 in FIG. 2, the NOx catalyst 264 is positioned upstream of the EGR cooler 266. However, although less desirable, in other embodiments, the NOx catalyst 264 could be positioned downstream of the EGR cooler 266 if desired. Because the amount of recirculating exhaust gas flowing through the LP EGR line 224 is usually less than the amount of exhaust gas flowing through the main exhaust line 222, the capacity (e.g., size and amount of catalytic materials) can be less than the NOx reducing portion of the three-way catalyst 270 or stand-alone NOx catalyst in the main exhaust line. In this manner, the build-up of nitric acid in the air intake line 232 can be reduced at a small expense (or in some cases a cost-savings) and without significant open space depletion. Moreover, because the capacity of the NOx catalyst 264 is less, the NOx catalyst induces less backpressure (e.g., less restriction to flow) within the LP EGR line 224.

Figure 3:
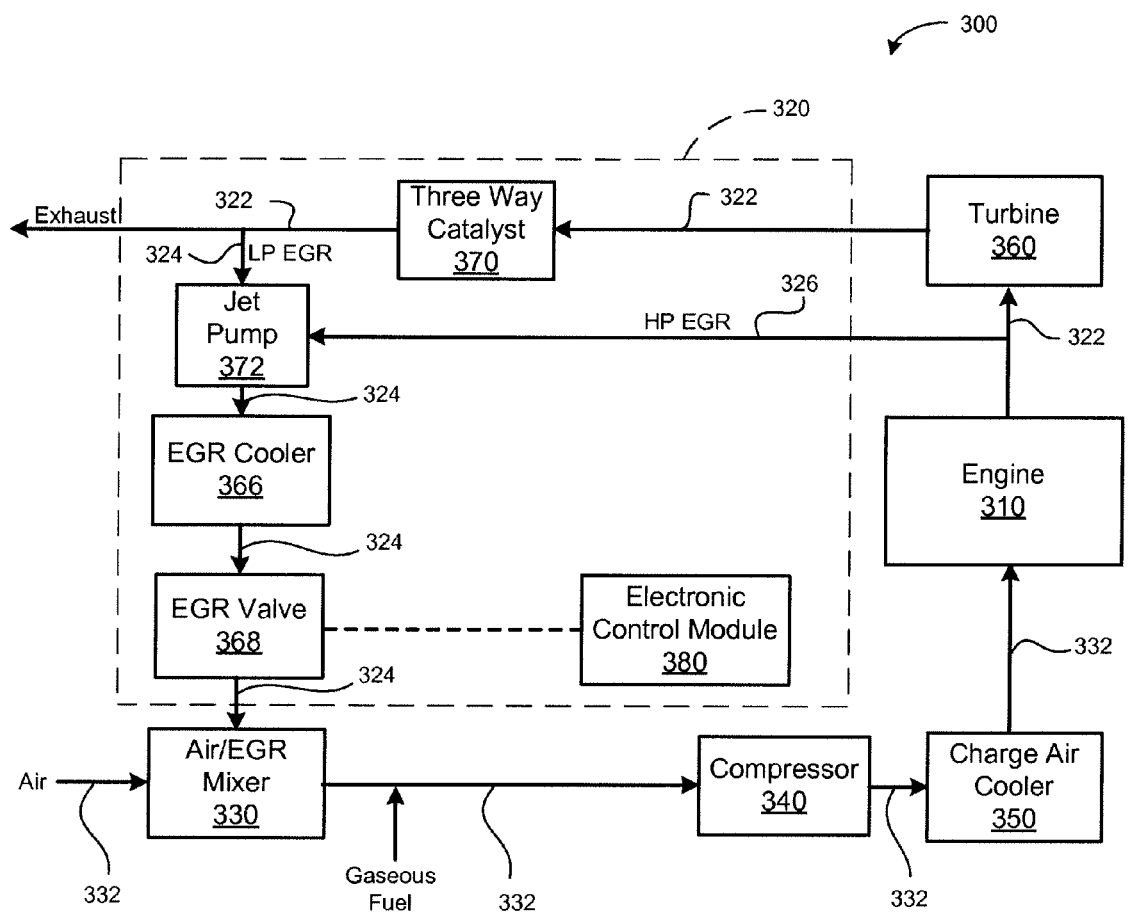
FIG. 3 is a schematic diagram of an internal combustion engine system having an exhaust system with a three-way catalyst and a low-pressure EGR line downstream of the three-way catalyst according to one embodiment.

Referring to FIG. 3, another embodiment of an internal combustion engine system 300 is shown. The engine system 300 includes features and components similar to the features and components of the engine system 100 of FIG. 1, and features and components similar to the exhaust system 220 of FIG. 2, with like numbers and titles referring to like elements. For example, like the exhaust system 220 of FIG. 2, the exhaust system 320 of the engine system 300 includes a main exhaust line 322 with a three-way catalyst 370 as defined above and an LP EGR line 324 in exhaust receiving communication with the main exhaust line. However, the inlet of the LP EGR line 324 is positioned downstream of the three-way catalyst 370, as opposed to upstream of the three-way catalyst as with the exhaust system 220. Additionally, because the inlet of the LP EGR line 324 is downstream of the three-way catalyst 370, which includes a NOx reducing section or a stand-alone NOx catalyst, the LP EGR line 324 does not include a separate NOx catalyst for reducing NOx. In other words, the three-way catalyst 370 reduces NOx in the main exhaust line 322 before a portion of the exhaust is recirculated through the LP EGR line 324. In this manner, the build-up of nitric acid in the air intake line 232 can be reduced without the need for an additional NOx catalyst in the LP EGR line 324. Nevertheless, in certain implementations, the LP EGR line 324 may include a NOx catalyst if desired, such as when the exhaust system 320 includes a high pressure (HP) EGR line.

In contrast to the exhaust system 220, the exhaust system 320 includes an HP EGR line 326 with an inlet upstream of the turbine 360. Because the pressure of the exhaust gas exiting the engine 310, and prior to entering the turbine 360, is greater than the pressure of the exhaust gas exiting the turbine, the EGR line 326 coupled to the main exhaust line 322 upstream of the turbine is considered a high pressure EGR line. The HP EGR line 326 not only provides a means for recirculating exhaust gas back to the engine 310, but acts to drive exhaust gas recirculation through the LP EGR line 322. As described above, because the pressure of the exhaust gas in the main exhaust line 322 downstream of the turbine 360, a flow regulation device is required to create the necessary pressure differential to induce recirculating exhaust gas from the main exhaust line 322 into the air intake line 332.

As shown in FIG. 3, the LP EGR line 322 includes a pump (e.g., jet pump 372) that is powered by the high pressure exhaust in the HP EGR line 326 to pump exhaust gas from the main exhaust line 322, through the LP EGR line 324, and into the air intake line 332. Generally speaking, the high pressure exhaust gas (e.g., motive fluid) in the HP EGR line 326 drives the driven low pressure exhaust gas (e.g., suction fluid) in the LP EGR line 324 through the jet pump 372. The jet pump 372 can be any of various kinds of pumps. In one implementation, the jet pump 372 includes a Venturi-type nozzle. As the motive high pressure exhaust gas passes through the converging inlet of the nozzle and into the diverging outlet, the high pressure energy of the exhaust gas in the HP EGR line 326 is converted to velocity energy, which induces a pressure differential. The pressure differential essentially draws or sucks low pressure exhaust gas through the nozzle as it mixes with the high pressure exhaust gas. The mixed exhaust gas then flows into the air/EGR mixer 330 of the air intake line 332 at a rate determined by the electronic control module 380 and associated EGR valve 368. Although the flow regulating device, of the exhaust system 320 is shown and described as a pump or jet pump, in other embodiments, the flow regulating device can be any of various other types of devices capable of utilizing high pressure exhaust to draw low pressure exhaust into the air intake line 332.

Figure 4:
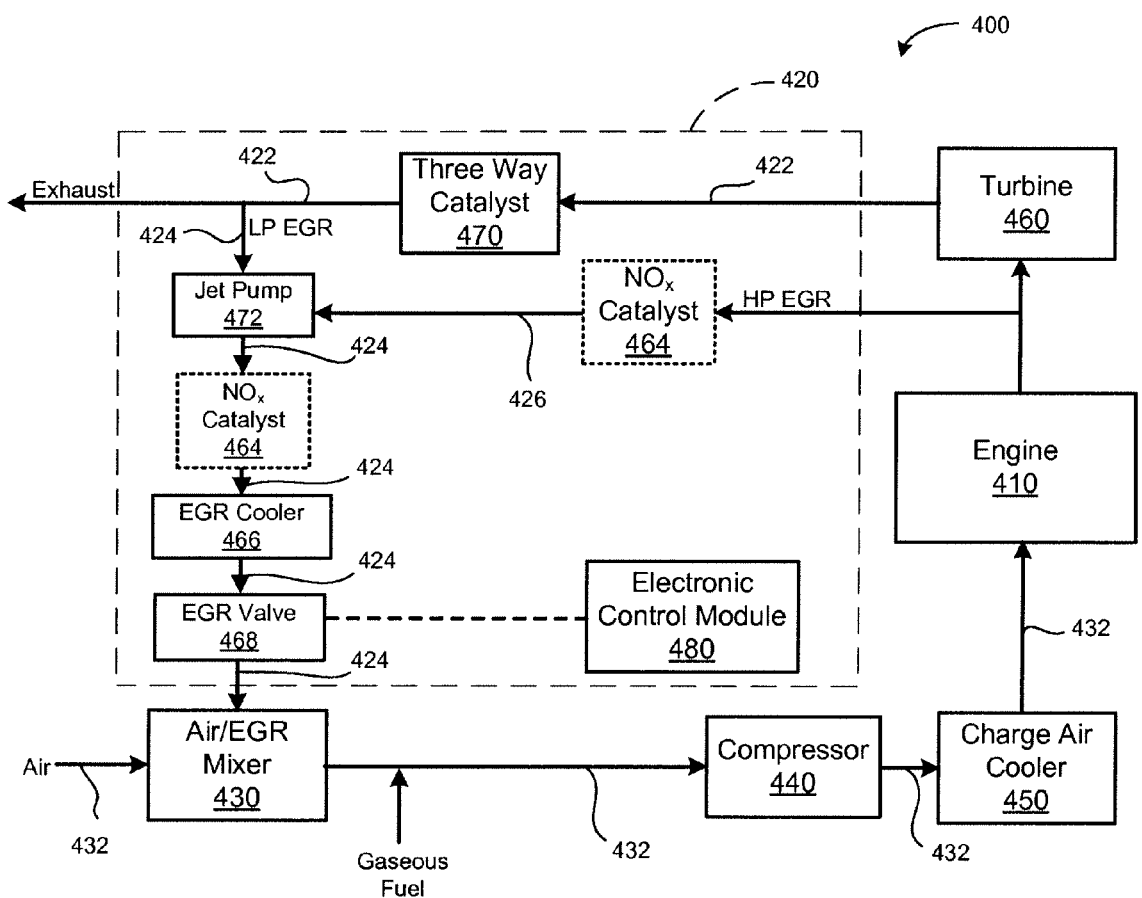
FIG. 4 is a schematic diagram of an internal combustion engine system having an exhaust system with a three-way catalyst, a low-pressure EGR line downstream of the three-way catalyst, and a high-pressure EGR line upstream of a turbine of the engine system according to one embodiment.

According to yet another embodiment shown in FIG. 4, an internal combustion engine system 400 includes features and components similar to the features and components of the engine system 300 of FIG. 3, with like numbers and titles referring to like elements. For example, like the exhaust system 320 of FIG. 3, the exhaust system 420 of the engine system 400 includes a main exhaust line 422 with a three-way catalyst 470, an LP EGR line 424 in exhaust receiving communication with the main exhaust line downstream of the three-way catalyst, and an HP EGR line 426 upstream of the turbine 460.

However, unlike the exhaust system 320 of FIG. 3, the exhaust system 420 includes a separate NOx catalyst 464 in one or both of the LP and HP EGR lines 424, 426, respectively, for reducing NOx from the untreated exhaust gas recirculating through the HP EGR line before it mixes with the air intake line 432. The NOx catalyst 464 is identified using dashed lines to indicate alternative or optional positions of the NOx catalyst. For example, in one implementation, the exhaust system 420 includes an NOx catalyst 424 positioned within the HP EGR line 426 and no NOx catalyst 424 downstream of the jet pump 472. According to another implementation, the exhaust system 420 includes an NOx catalyst 424 positioned within the LP EGR line 424 downstream of the jet pump 472 and no NOx catalyst 424 within the HP EGR line 426. The inclusion of the NOx catalyst 424 downstream of the jet pump 472 may allow the NOx reducing portion of the three-way catalyst to be formed with less capacity (e.g., lower expense and space occupation) because a portion of the NOx is being reduced by the NOx catalyst 424. In yet another implementation, the exhaust system 420 may include both an NOx catalyst 424 within the LP EGR line 424 downstream of the jet pump 472 and an NOx catalyst 424 within the HP EGR line 426.

Figure 5:
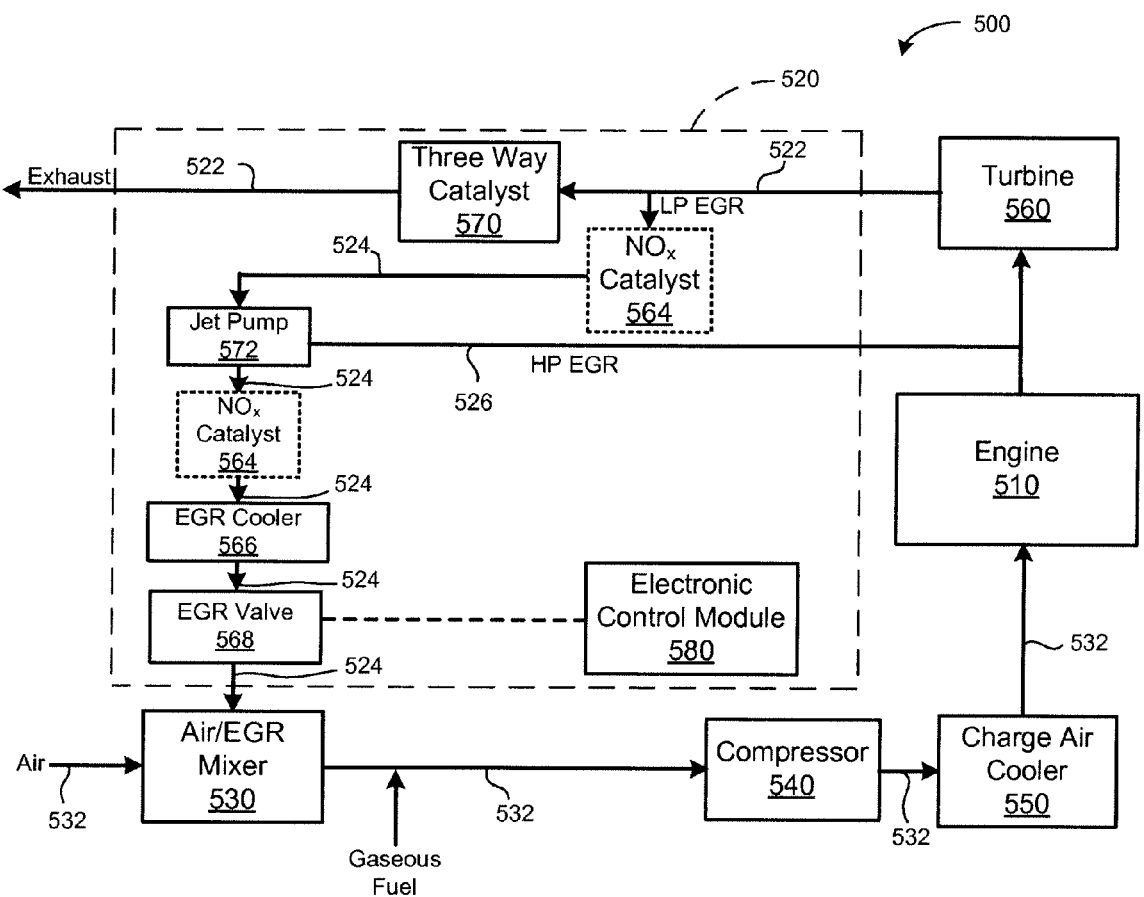
FIG. 5 is a schematic diagram of an internal combustion engine system having an exhaust system with a three-way catalyst, a low-pressure EGR line upstream of the three-way catalyst, and a high-pressure EGR line upstream of a turbine of the engine system according to one embodiment.

Referring to FIG. 5, another embodiment of an internal combustion engine system 500 is shown. The engine system 500 includes features and components similar to a combination of features and components of the engine systems 200, 300, 400 of FIGS. 2, 3 and 4, respectively, with like numbers and titles referring to like elements. For example, like the exhaust system 220 of FIG. 2, the exhaust system 520 of the engine system 500 includes a main exhaust line 522 with a three-way catalyst 570 and an LP EGR line 524 upstream of the three-way catalyst. Additionally, like the exhaust system 320 of FIG. 3, the exhaust system 520 includes a HP EGR line 526 upstream of the turbine 560 and a jet pump 572 driving the low pressure exhaust gas through the LP EGR line 524. Further, like the exhaust system 420 of FIG. 4, the exhaust system 520 includes a separate NOx catalyst 564 in one or both of the LP and HP EGR lines 524, 526, respectively, for reducing NOx from the untreated exhaust gas recirculating through the HP EGR line before it mixes with the air intake line 532.

Figure 6:
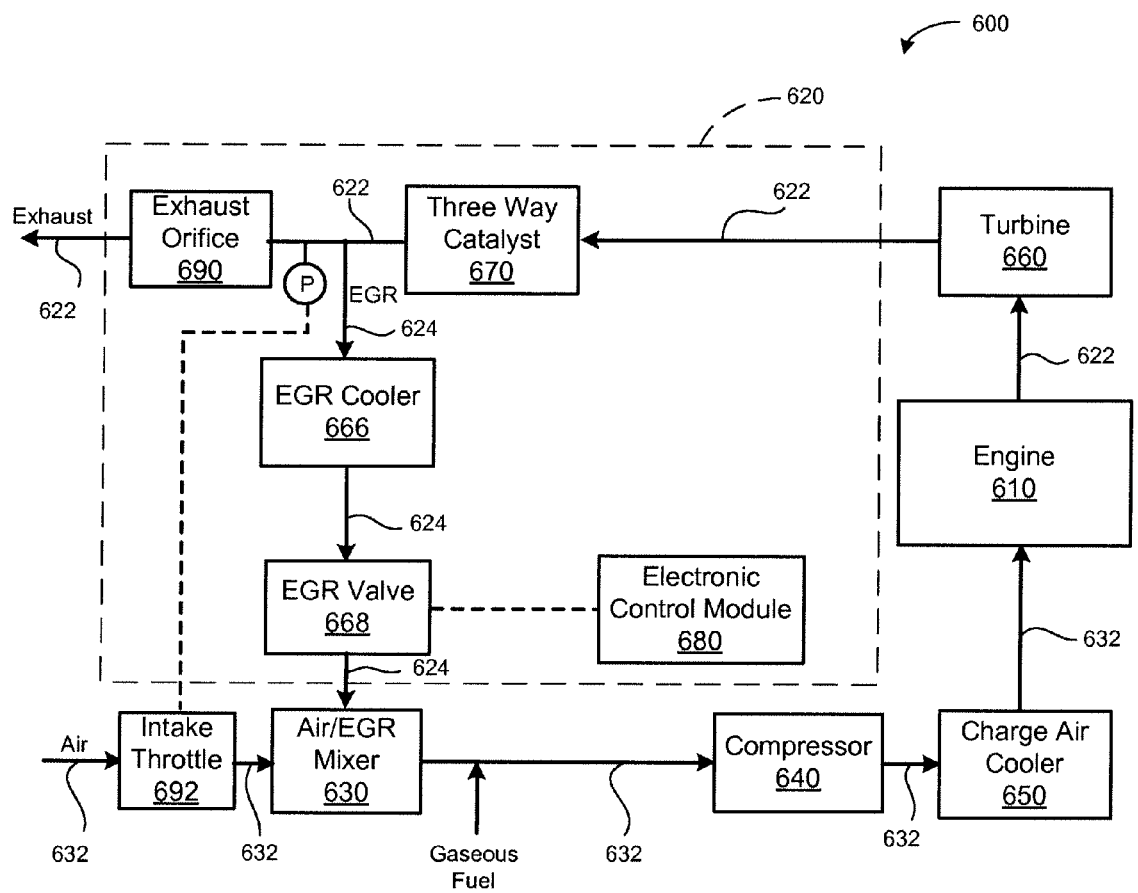
FIG. 6 is a schematic diagram of an internal combustion engine system having an exhaust system with a three-way catalyst, a low-pressure EGR line downstream of the three-way catalyst, and an exhaust gas pressure regulator downstream of the three-way catalyst and EGR line according to one embodiment.

According to another embodiment shown in FIG. 6, an internal combustion engine system 600 includes features and components similar to the features and components of the engine system 200 of FIG. 2, with like numbers and titles referring to like elements. For example, like the exhaust system 220, the exhaust system 620 of the engine system 600 includes a main exhaust line 622 with a three-way catalyst 670, and an LP EGR line 624 in exhaust receiving communication with the main exhaust line downstream of the three-way catalyst.

However, instead of an exhaust throttle as an exhaust flow regulator and back pressure inducer, the exhaust system 220 includes an exhaust orifice 690 and an intake throttle 692. The exhaust orifice 690 includes a passive, non-adjustable restriction channel having a cross-sectional area less than that of the main exhaust line 622. The restriction channel of the exhaust orifice 690 partially obstructs the flow of exhaust gas through the main exhaust line 622, which induces a backpressure in the main exhaust line. The induced backpressure increases the pressure of the exhaust gas in the main exhaust line 622, which creates the necessary pressure differential between the main exhaust line and the air intake line 632 to recirculate exhaust gas through the LP EGR line 624. Because the exhaust orifice 690 provides a fixed restriction, the pressure increase induced by the orifice is dependent upon the flow rate of exhaust gas through the main exhaust line. To compensate for changes in the backpressure within the main exhaust line 622 at different exhaust flow rates, the exhaust system 620 includes a pressure sensor just upstream of the exhaust orifice 690. The pressure sensor detects the pressure of the exhaust gas via a physical or virtual sensor. Based on the detected pressure of the exhaust gas, the intake throttle 692 is actuatable to modulate the flow rate of air through the air intake line 632 to achieve a desired backpressure (e.g., total exhaust pressure) for accomplishing EGR strategies. In some implementations, the pressure sensor and intake throttle can be electronically coupled to the electronic control module 680, which controls the position of the intake throttle based on the received pressure readings from the sensor.

Figure 7:
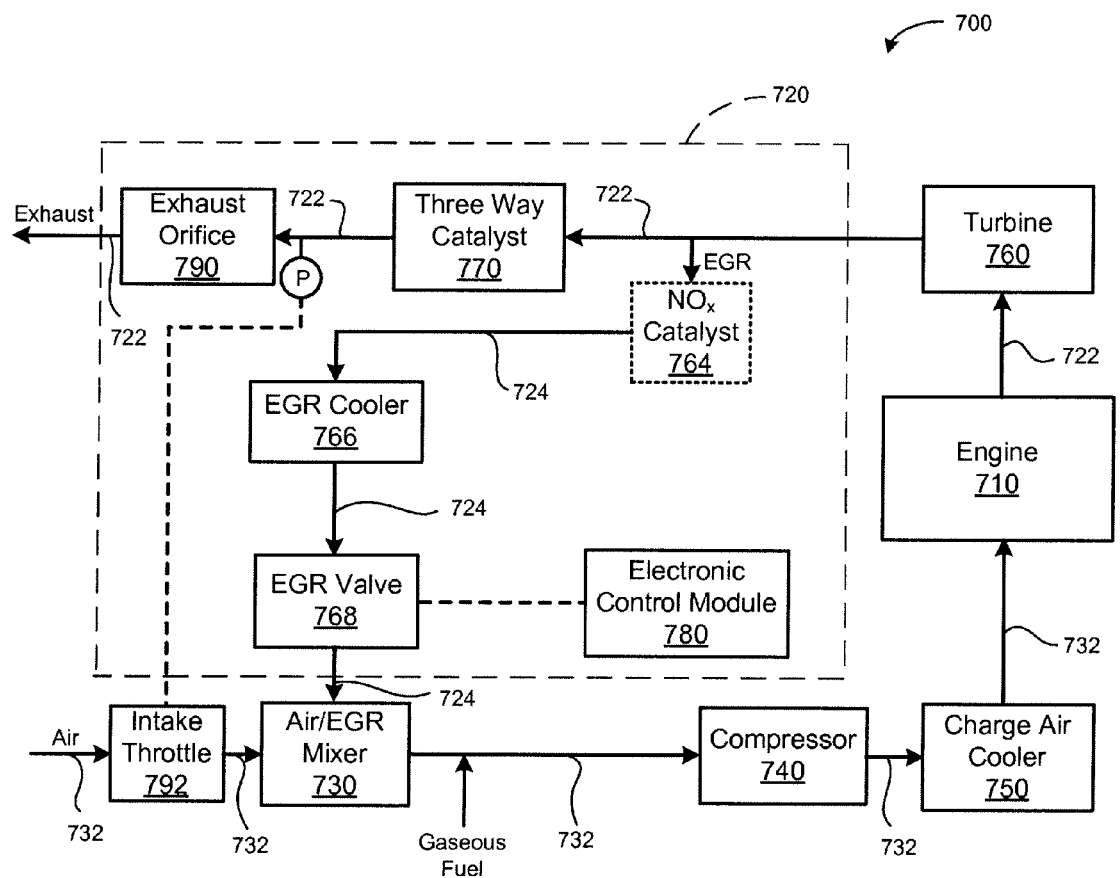
FIG. 7 is a schematic diagram of an internal combustion engine system having an exhaust system with a three-way catalyst, a low-pressure EGR line upstream of the three-way catalyst, and an exhaust gas pressure regulator downstream of the three-way catalyst and EGR line according to one embodiment.

According to another embodiment shown in FIG. 7, an internal combustion engine system 700 includes features and components similar to the features and components of the engine system 600 of FIG. 6, with like numbers and titles referring to like elements. For example, like the exhaust system 620, the exhaust system 720 of the engine system 700 includes a main exhaust line 722 with a three-way catalyst 770, an LP EGR line 724 in exhaust receiving communication with the main exhaust line, and an exhaust orifice 790 and dependently-operated intake throttle 792. However, instead of the LP EGR line 764 being positioned downstream of the three-way catalyst 770, the LP EGR line 764 is positioned upstream of the three-way catalyst with a separate NOx catalyst 764 positioned within the LP EGR line similar to the NOx catalyst 264 of FIG. 2.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An internal combustion engine system, comprising:
   a spark-ignited internal combustion engine powered by a gaseous fuel;
   an air intake in air providing communication with the internal combustion engine;
   an exhaust system in exhaust gas receiving communication with the internal combustion engine, the exhaust system comprising a methane oxidation catalyst through which at least a portion of the exhaust gas flows, a first exhaust gas recirculation line in exhaust gas providing communication with the air intake, and a second exhaust gas recirculation line in exhaust gas providing communication with the first exhaust gas recirculation line; and
   a turbocharger having a turbine co-rotatably coupled with a compressor, the turbine being in exhaust gas receiving communication with the internal combustion engine and exhaust gas providing communication with the methane oxidation catalyst, and the compressor being in air receiving communication with the air intake and charge air providing communication with the engine, wherein the second exhaust gas recirculation line is positioned upstream of the turbine.

2. The system of claim 1, wherein the first exhaust gas recirculation line is positioned upstream of the methane oxidation catalyst and downstream of the turbine.

3. The system of claim 2, wherein the exhaust system further comprises a pump in exhaust gas receiving communication with the first and second exhaust gas recirculation lines and exhaust providing communication with the air intake.

4. The system of claim 3, wherein the exhaust system further comprises a nitrogen oxide reduction catalyst positioned downstream of the pump.

5. The system of claim 2, wherein the exhaust system further comprises a nitrogen oxide reduction catalyst positioned within the second exhaust gas recirculation line.

6. The system of claim 5, wherein the nitrogen oxide reduction catalyst is a first nitrogen oxide reduction catalyst, and further comprising a second nitrogen oxide reduction catalyst positioned downstream of the pump.

7. The system of claim 1, wherein the first exhaust gas recirculation line is positioned downstream of the methane oxidation catalyst.

8. The system of claim 7, wherein the exhaust system further comprises a pump in exhaust gas receiving communication with the first and second exhaust gas recirculation lines and exhaust providing communication with the air intake.

9. The system of claim 8, wherein the exhaust system further comprises a nitrogen oxide reduction catalyst positioned downstream of the pump.

10. The system of claim 7, wherein the exhaust system further comprises a nitrogen oxide reduction catalyst positioned within the second exhaust gas recirculation line.

11. The system of claim 10, wherein the nitrogen oxide reduction catalyst is a first nitrogen oxide reduction catalyst, and further comprising a second nitrogen oxide reduction catalyst positioned downstream of the pump.

12. The system of claim 1, wherein the exhaust system further comprises a passive exhaust orifice positioned downstream of the methane oxidation catalyst, and wherein the air intake comprises an intake throttle.

13. The system of claim 1, wherein the methane oxidation catalyst comprises a methane oxidation stage of a three-way catalyst, the three-way catalyst further including a nitrogen oxide reduction stage positioned downstream of the methane oxidation stage.

14. An exhaust system for use with a spark-ignited gaseous fuel internal combustion engine comprising a turbocharger having a turbine in exhaust receiving communication with the engine and a compressor in charge air providing communication with the engine, the system comprising:
  a main exhaust gas line in exhaust gas receiving communication with the turbine;
  a three-way catalyst positioned within the main exhaust line, the three-way catalyst configured to oxidize carbon monoxide and methane, and reduce nitrogen oxides present in the exhaust gas flowing through the main exhaust gas line; and
  an exhaust gas recirculation line in exhaust gas receiving communication with the main exhaust line and exhaust gas providing communication with air flow received by the compressor, the exhaust gas recirculation line being positioned downstream of the three-way catalyst and including a nitrogen oxide reduction catalyst positioned within the exhaust gas recirculation line,
  wherein the exhaust gas recirculation line is a first exhaust gas recirculation line, and further comprising a second exhaust gas recirculation line in exhaust gas providing communication with the first exhaust gas recirculation line.

15. The system of claim 14, wherein the exhaust system further comprises a pump in exhaust gas receiving communication with the first and second exhaust gas recirculation lines and exhaust providing communication with the air intake.

16. The system of claim 15, wherein the exhaust system further comprises a nitrogen oxide reduction catalyst positioned downstream of the pump.

17. The system of claim 14, wherein the exhaust system further comprises a nitrogen oxide reduction catalyst positioned within the second exhaust gas recirculation line.

18. The system of claim 17, wherein the nitrogen oxide reduction catalyst is a first nitrogen oxide reduction catalyst, and further comprising a second nitrogen oxide reduction catalyst positioned downstream of the pump.

19. The system of claim 14, wherein the three-way catalyst includes a methane oxidation stage positioned upstream of a nitrogen oxide reduction stage.

* * * * *